S. HUDSON.
Grain Register.
No. 78,208. Patented May 26, 1868.
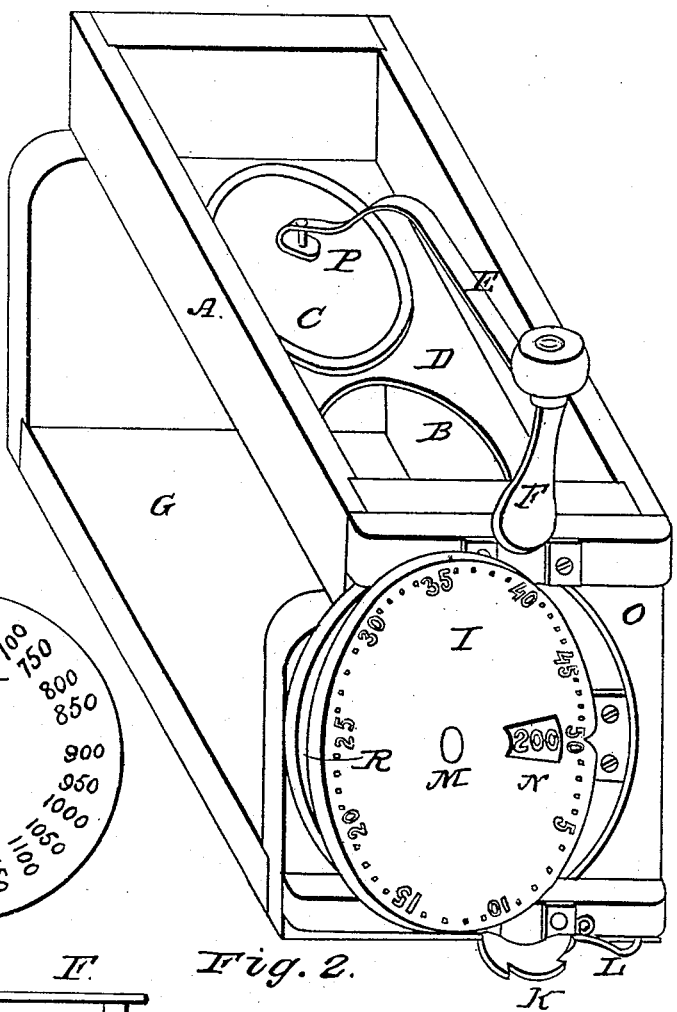

United States Patent Office.

SIDNEY HUDSON, OF MILFORD, MICHIGAN.

Letters Patent No. 78,208, dated May 26, 1868.

---

IMPROVEMENT IN GRAIN-REGISTERS.

---

The Schedule referred to in these Letters Patent and making part of the same.

---

TO WHOM IT MAY CONCERN:

Be it known that I, SIDNEY HUDSON, of Milford, in the county of Oakland, in the State of Michigan, have invented an Improvement in Machines for Tallying Grain; and I do declare that the following is a just, true, and accurate description thereof, reference being had to the accompanying drawings, and to the letters of reference marked thereon, making part of this specification.

Figure 1 is a perspective view of my invention, showing the tallying-apparatus on the end, and the striking-slide inside the box.

Figure 2 is a rear view of the tallying-apparatus detached from the box.

Figure 3 is a front view of the inner disk of the tallying-apparatus.

The same letters refer to similar parts in each figure.

The object of my invention is to make it easy to measure and keep the tally of grain, as it comes from threshing-machines, by a certain and positive mechanism which saves labor and prevents mistakes.

To enable those skilled in the art to fully understand and manufacture my machine, I will now proceed to describe it.

A is a proper box or receiver, upon a suitable standard or frame, O, to be placed under the delivery-spout of a threshing-machine. This box A has a bottom, D, with an aperture, B, and another aperture similar to B under the striker C. This striker C is worked by connecting-rod E, attached to it by a suitable device at P. At its opposite end this connecting-rod E is attached to the crank, F, which is attached to the top of the shaft H. This shaft is provided with a worm, Q. I is a revolving unit-register, counting from 1 to 50, as indicated upon its face. This unit-register I is provided with fifty cogs, as shown in fig. 2, which mesh into the worm upon the shaft H. This unit-register I has a rim, R, cast upon it, upon which are cast the fifty cogs referred to. Inside this rim R is placed the register J, which adds or increases by fifties, as shown in fig. 3. This register J is provided with forty-eight cogs, as shown in fig. 2, which also mesh into the worm on the shaft H. Both the registers I and J work upon a common centre, M, and the figures upon the face of the inner register J are exposed to view through the openings N in the unit-register I. K is a ratchet attached to the bottom of the shaft H, and provided with pawl L to prevent the possibility of reversing the motion of the apparatus.

Having thus described the various parts of my machine, I will explain the manner of using it.

We will suppose that the number 1,200, (shown upon the inner register in fig. 3,) is exposed to view through the opening in the unit-register I, in fig. 1. Then I place the box or receiver under the delivery-spout of a threshing-machine. I place two measures side by side under the bottom, D, of the box or receiver, and upon the ground or floor G. These measures stand directly under the apertures B, one of which is closed by the striker C. As the grain pours into the box, it runs through the open aperture and fills the measure underneath. When the measure is full, I turn the crank, F, half way round, when the striker is drawn over the open aperture, and cuts off the grain, which immediately commences to run through the other aperture. When the measure under the last-mentioned aperture is filled, I give the crank another half turn, and the flow of grain is cut off, and the other aperture is opened, and so on, opening each aperture and filling each measure alternately. Every revolution of the crank, as above described, tallies "1" upon the unit-register, until a complete revolution of the register has been made, when "50" is tallied upon the inner register, and exposed to view through the opening in the unit-register. The next revolution tallies "100" upon the inner register, which will be exposed to view in the same manner, and so on, until "1,200" has been tallied upon the inner register, when it recommences at "50" on the inner register.

What I claim as my invention, and desire to secure by Letters Patent, is—

1. The construction of the striker C, and its connections, working over the apertures B, in the receiving-box A, substantially as described for the purpose designed.

2. The combination and arrangement of the striking and tallying-machines, substantially as described for the purposes indicated.

SIDNEY HUDSON.

Witnesses:
H. S. SPRAGUE,
GEO. RUHLANDT.